Aug. 26, 1969 W. R. YOUNT 3,463,888

CIRCUITS WITH ELECTROLUMINESCENT-PHOTOCONDUCTIVE DYNAMIC LEVEL CONTROL

Filed Dec. 30, 1965 3 Sheets-Sheet 1

INVENTOR.
WILLIAM R. YOUNT
BY D. Kendall Cooper
ATTORNEY.

Aug. 26, 1969 W. R. YOUNT 3,463,888

CIRCUITS WITH ELECTROLUMINESCENT-PHOTOCONDUCTIVE DYNAMIC LEVEL CONTROL

Filed Dec. 30, 1965 3 Sheets-Sheet 2

Aug. 26, 1969 W. R. YOUNT 3,463,888
CIRCUITS WITH ELECTROLUMINESCENT-PHOTOCONDUCTIVE DYNAMIC LEVEL CONTROL
Filed Dec. 30, 1965 3 Sheets-Sheet 3

United States Patent Office 3,463,888
Patented Aug. 26, 1969

3,463,888

CIRCUITS WITH ELECTROLUMINESCENT-PHOTO-CONDUCTIVE DYNAMIC LEVEL CONTROL

William R. Yount, Lexington, Ky., assignor to International Business Machines Corporation, Armonk, N.Y., a corporation of New York Filed Dec. 30, 1965, Ser. No. 517,636
Int. Cl. H03f *17/00*
U.S. Cl. 179—100.1 7 Claims

ABSTRACT OF THE DISCLOSURE

An amplifier circuit has photoconductive elements and an associated electroluminescent panel. The panel and the elements are arranged in a lighttight set. A portion of the electroluminescent panel extends outside the packet to provide a visual indication of signal levels in the circuit to an observer. The light output from the panel is directed through the photocells in a negative feedback relationship to compress the peak signals, thereby minimizing distortion and overloading in the circuit. One of the photoconductive elements in the set is switchable in and out of the circuit. Additional complete sets can be switched in and out of the circuit.

For illustrative purposes, the circuit arrangements of the invention are shown in connection with dictation equipment having facilities for recording and reproducing speech signals on a magnetic record media, such as a magnetic belt. Such equipment is normally provided with transducer means for deriving electrical signals from audio signals during the recording of information and for supplying audio signals in response to electrical signals during the reproduction of information; amplifying circuits having a plurality of amplifying stages for processing the signals during recording and reproducing operations; and a number of control adjuncts enabling the user of the equipment to effect various control functions such as starting and stopping the drive of the media, establishing the propert modes of operation, effecting instruction indications on an indexing slip, and similar functions. In the case of a magnetic belt record media, for example, the belt is moved past a magnetic head which also moves, the combined movement of belt and head generating a helical path on the belt.

The amplifying circuits of dictating equipment are usually set for best response to audio signals having a predetermined frequency range and having predetermined volume level characteristics. It is desirable to maintain the signals passing through the amplifier circuits within the predetermined frequency and level ranges to insure best quality recording and reproduction of signals. Without undue expense, it has been difficult in the prior art to accommodate wide ranges of input signals encountered by the equipment. The quality of recording is affected by many factors that are difficult to control, such as variance in speech intensity, that is, loudness and softeness, among the various persons who may use the equipment, the proximity of the individual to the microphone during recording, and similar factors. Numerous efforts have been made in the prior art to compensate for circuit overloading, distortion, and similar effects tending to reduce the quality of recording. Some circuits have provision for automatic gain control involving the control of the active elements, such as transistors, by varying their operating point to compensate for high signal levels. Most circuits of this nature have some adverse affects themselves, including overloading, high power requirements, and distortion.

Accordingly, an object of the invention is to provide simplified signal level control arrangements for amplifying circuits.

Another object of the invention is to provide peak level control for amplifying circuits.

Still another object of the invention is to provide dynamic level control arrangements wherein circuit loading is minimized.

A further object of the invention is to provide dictation circuits with dynamic level control effective during one mode of operation and ineffective during another mode of operation.

Still another object of the invention is to provide dynamic level control circuits that are effective to minimize distortion and overloading, thereby insuring high quality recording of signals.

Still another object of the invention is to provide level control circuits that are operable over wide frequency ranges, or selected frequency ranges, as required.

Another object of the invention is to provide level control circuits with fast response and release times.

Also, an object of the invention is to provide selectivity of level control depending upon the range of signals encountered and the application involved.

A still further object of the invention is to provide dynamic level control arrangements that are operable to control signal levels in an amplifying circuit while concurrently supplying visual indications of signal levels.

In order to accomplish these and other objects of the invention, a combined recording-reproducing circuit is controlled by a feedback loop including electroluminescent and photocell elements arranged for rapid signal level control with minimum circuit loading. The electroluminescent portion of the control arrangements, in one case, provides a visual indication of signal levels in the circuit. In an alternative arrangement, electroluminescent-photocell combinations are switchable to exert signal level control with faster or less rapid response characteristics depending upon the audio signal recording situation encountered. Provision is also made to render the dynamic level control arrangement effective during one mode of operation of the equipment under operator control and to render the arrangement ineffective during another mode of operation, also under operator control.

The foregoing and other objects, features, and advantages of the invention will be apparent from the following more particular description of the various embodiments of the invention as illustrated in the accompanying drawings.

Figure 4:
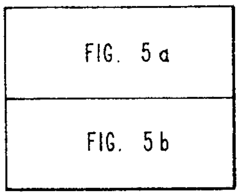

FIG. 4 indicates the proper arrangement of FIGS. *5a* and *5b* that are representative of recording and reproducing circuits with dynamic level control for use in dictation equipment.

Figures 5A, 6:
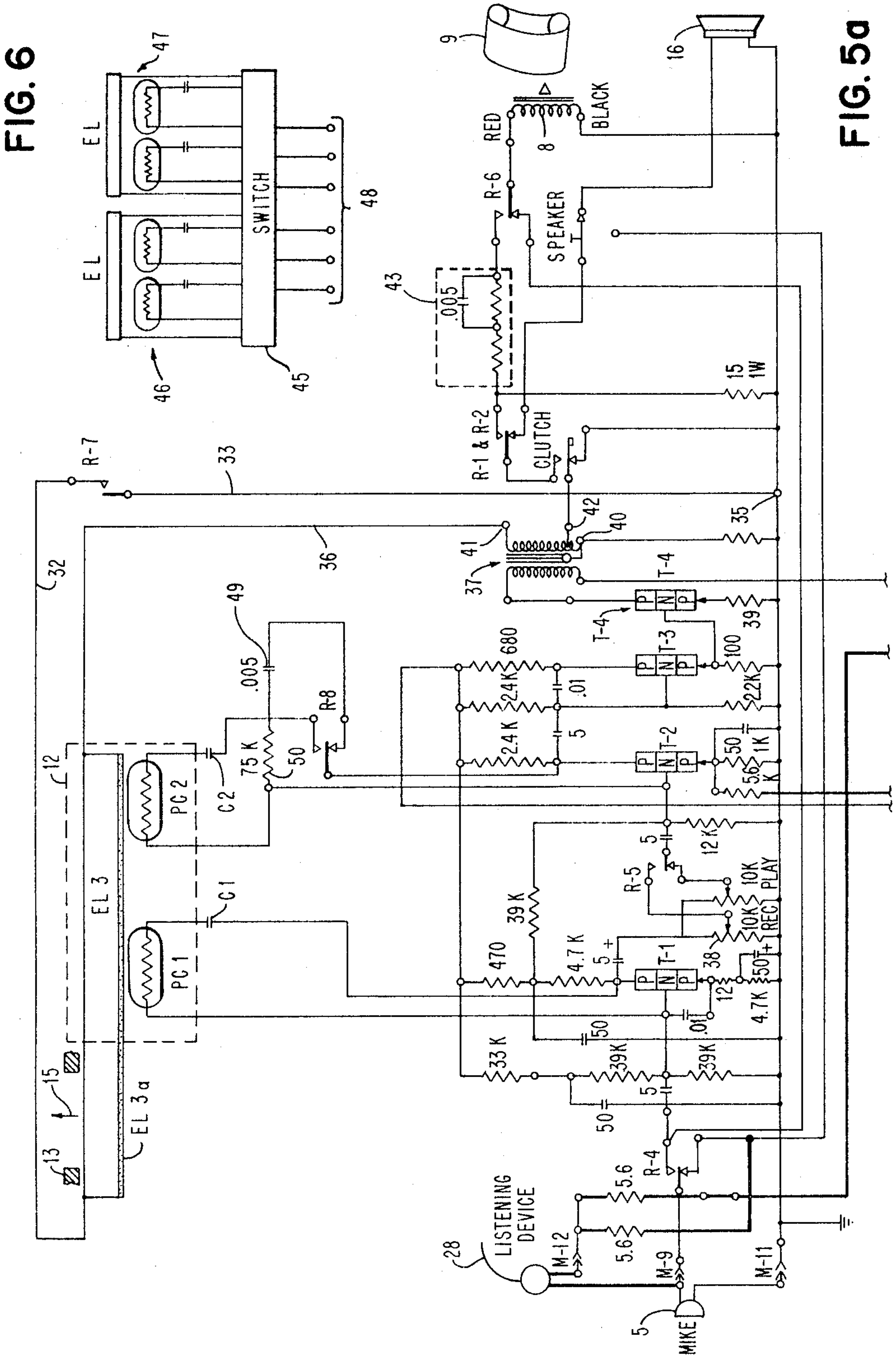

FIG. 6 illustrates an alternative arrangement of the dynamic level control circuits disclosed herein to permit the selection of various electroluminescent-photocell combinations for a number of audio signal control situations, such as, speech or music.

Figure 1:
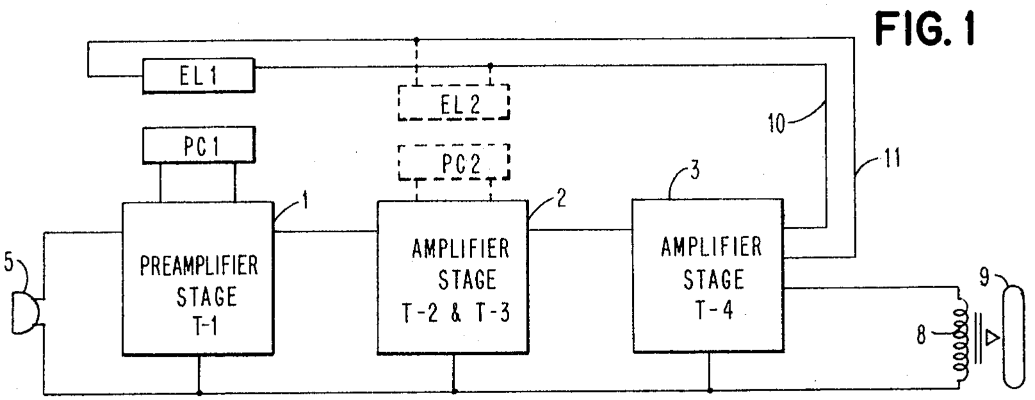
FIG. 1 represents dynamic level control and amplifier circuits in block form arranged according to the principles of the present invention.

FIG. 1 represents the amplifier portion of the circuits and includes a preamplifier stage 1, an intermediate amplifier stage 2, and a final amplifier stage 3. The various amplifier stages 1, 2, and 3 include transistors T–1, T–2, T–3 and T–4 as indicated in FIG. 1, and as shown in greater detail in FIG. *5a*. The circuit of FIG. *5a* is a combined recording-reproducing circuit for use, as an example, in dictating equipment. The block diagram in FIG. 1 represents the circuit of FIG. 5*a* during the recording mode of operation. During the recording of signals in a dictating environment, audio signals are directed to a microphone transducer 5 that is housed in a microphone-control handset 6, FIG. 2. The signals are amplified in the various stages 1, 2, and 3, FIG. 1, and directed to a record-playback head 8 for recording on a record media, such as a magnetic belt 9. In order to prevent overloading and distortion of signals during the recording process, the block diagram circuit of FIG. 1, as well as the more detailed version of FIG. 5*a*, are supplied with electroluminescent and photoconductive elements. An exciting potential is derived on lines 10 and 11, FIG. 1 and directed to an electroluminescent panel designated EL1. Panel EL1 is arranged in proximity to a photoconductive element PC1 that controls preamplifier stage 1. Additional electroluminescent and photoconductive elements designated EL2 and PC2, FIG. 1, may be provided if additional dynamic level control is required in the circuit.

The electroluminescent-photoconductive arrangements of FIG. 5*a* are slightly different from those of FIG. 1. The photoconductive elements PC1 and PC2 are retained, but a single electroluminescent panel designated EL3 provides light stimulation for both photoconductive elements PC1 and PC2 during recording operations.

The electroluminescent panel EL3 and photoconductive elements PC1 and PC2 are preferably arranged in a light-tight packet 12 to eliminate the effects of extraneous light on photoconductive elements PC1 and PC2. A portion of electroluminescent panel EL3 designated EL3*a* extends outside packet 12 and may be arranged adjacent an opening in the housing of the dictating equipment to provide a visual indication of signal levels in the circuit to the user of the equipment. Such a housing is indicated at 13 with light rays 15 emanating from EL3*a* portion toward a viewer.

The dictation equipment discussed herein is not disclosed in every detail, but is generally comparable to the dictation equipment disclosed in U.S. patent application Ser. No. 216,261, entitled "Multiple Station Selection System," with N. J. Albanes and M. P. Langendorf as inventors, filed Aug. 10, 1962, and now U.S. Patent No. 3,222,460 and assigned to the same assignee as the present invention.

Figure 5B:
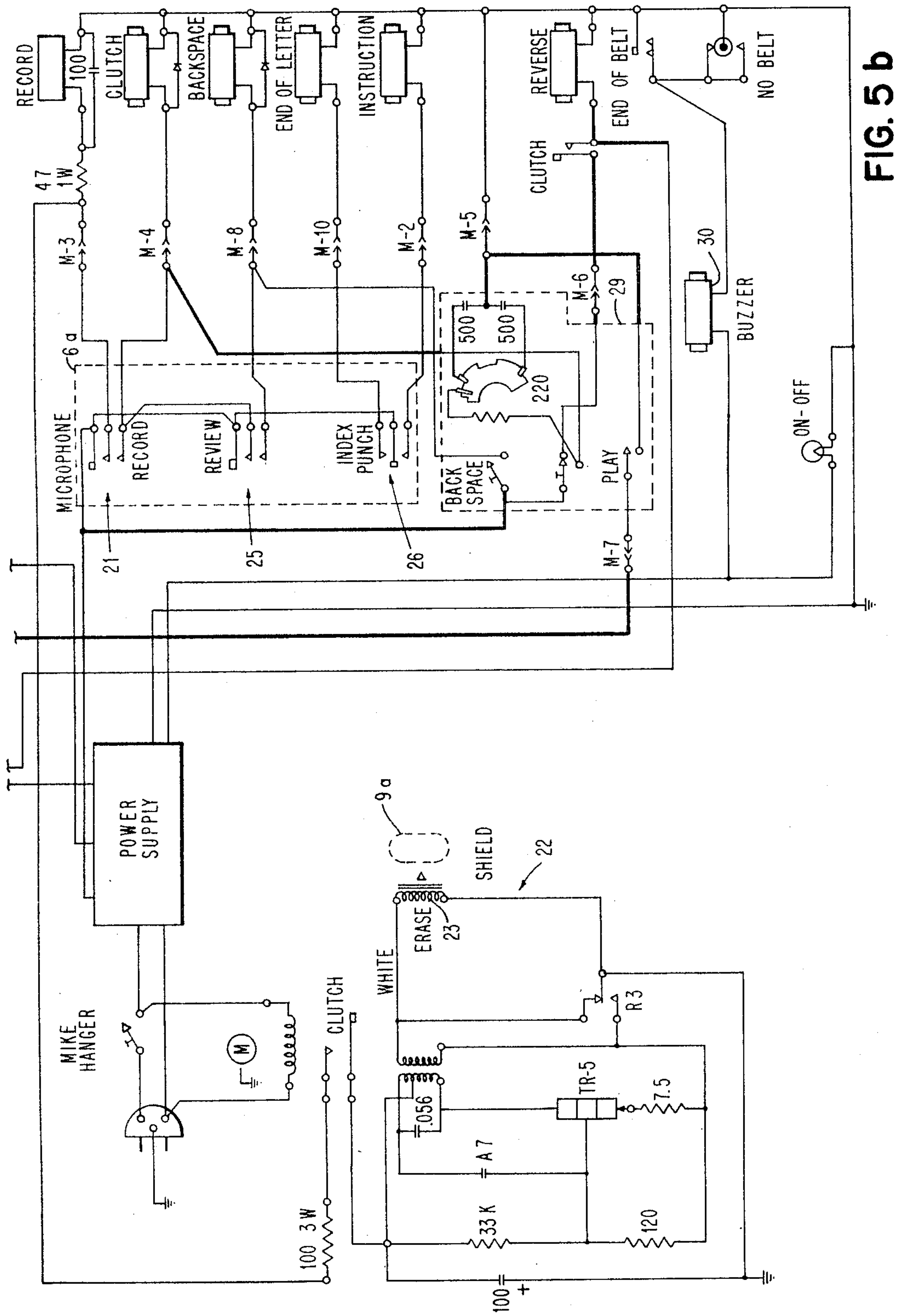

The electroluminescent-photocell arrangements of the present invention are rendered effective during a Record mode of operation of the equipment and are rendered ineffective during a reproducing (Listen) operation. The various modes of operation of the equipment are under control of the microphone-handset 6, FIG. 2. The internal switching circuits of microphone 6 are shown in FIG. 5*b* contained in a dashed block designated **6*a*. The transducer 5 of microphone handset 6 serves as a transducer during recording and reproduction of signals. Alternatively, a speaker 16**, FIG. 5*a*, can be switched into the circuit for reproduction of signals. Mode button 18 on handset 6, FIG. 2 has three positions designated Record-Listen-Review. An index button 19 has three positions designated Letter-Off-Secretary (Instruction).

To record material on belt 9, mode button 18 is moved to the Record position. Whenever the dictator wishes to dictate material, he depresses dictate bar 20 on microphone handset 6, FIG. 2. This closes contacts 21, FIG. 5*b*. Contacts 21 comprise several contact elements that close to energize a Record relay, FIG. 5*b*. Other contact elements energize a clutch magnet, FIG. 5*b*. The energization of the clutch magnet results in movement of belt 9 past magnetic head 8, FIG. 5*a*. Energization of the Record relay transfers associated contacts R–1 through R–8. Contacts R–1, R–2, R–4, R–5, and R–6 are used to establish proper connections for amplifying and recording signals in the circuit in FIG. 5*a*.

Contacts R–3 are used in the erase circuits indicated at 22, FIG. 5*b*, to develop an erase signal for the magnetic head through winding 23. Erase winding 23 is arranged in proximity to belt 9 in order to erase belt 9 just prior to the recording of new information. This is indicated by the dashed representation designated **9*a***. Contacts R–7 and R–8 are arranged in the electroluminescent and photocell circuits to render them effective during a recording operation and to render them ineffective during a reproducing operation.

To review previously dictated material, the dictator moves mode button 18 to the Review position thereby closing contacts 25, FIG. 5*b*. This drops the Record relay and energizes the Backspace magnet to effect backspacing of head 8 with respect to belt 9. Mode button 18 is spring loaded to the central Listen position during which time the clutch is energized for driving belt 9 past head 8. Since the Record relay is not energized at this time, contacts R–1, R–2, R–4, R–5, and R–6 are in the position shown in FIG. 5*a* and connections are established in the amplifier circuits for amplifying signals developed in head 8 and for supplying them to transducer 5 for listening by the dictator. Following review of material, the dictator may record over previously dictated material if he desires by again placing the mode button 18, FIG. 2, to the upper Record position and depressing dictate bar 20.

Figure 2:
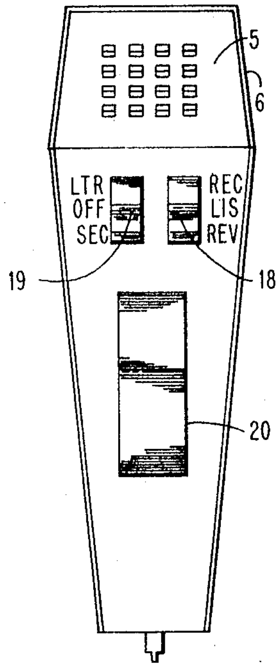
FIG. 2 represents a combined microphone-control handset for use with dictation equipment.

Movement of index button 19, FIG. 2, operates indexing contacts 26, FIG. 5*b*, in one direction energizing an End of Letter solenoid to perforate an index slip, not shown, and in the other direction to energize an Instruction solenoid to perforate the index slip in a different channel for later use when the dictated material is transcribed.

The circuits of FIGS. 5*a* and 5*b* are provided with a headset 28 and a foot control 29 that are connected to the recording equipment during transcription instead of the microphone handset 6. The various operations of the recording equipment are then under control of the foot control 29 enabling the transcriber to play back previously recorded material while operating a typewriter in order to prepare a draft, as an example. The foot control switches control a Reverse magnet in connection with the clutch so that belt 9 is moved in the reverse direction past head 8 along a previously recorded helical track rather than moving head 8 incrementally track by track as happens when the backspace magnet, FIG. 5*b*, is energized during dictation of material. A buzzer 30, FIG. 5*b*, supplies warning signals in the event no belt is in the equipment or the end of belt has been reached.

Figure 3:
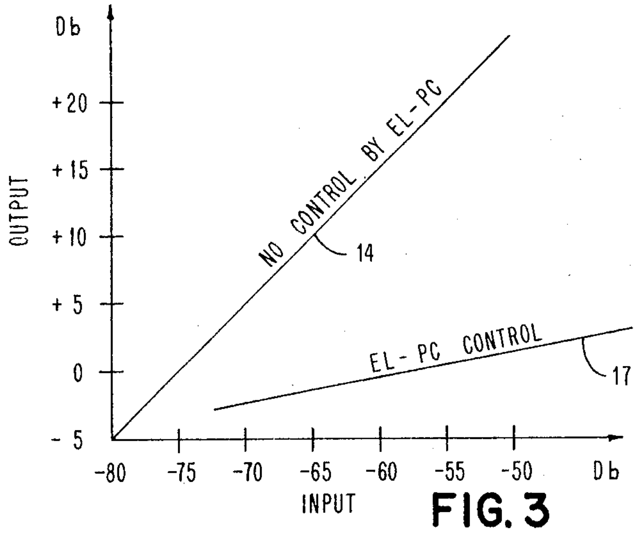
FIG. 3 is a graphical representation of circuit responses with and without the dynamic level control elements of the present invention.

During the Record mode of operation, the electroluminescent-photoconductive elements are automatically operative to control the signal levels in the amplifier circuits of FIG. 5*a*, thereby reducing distortion and overload and insuring high quality of recording of signals on belt 9. The effects of the electroluminescent-photoconductive control is shown in FIG. 3. The graph plots the input signal in decibels (db) in relation to output signals, also in decibels. As is conventional, and indication is made of the amplification of the input signal as it passes through the various amplifier stages of the circuit. Considering the graph line 14 with no controls exerted by the electroluminescent-photoconductive elements disclosed herein, the relationship of signals is such that for a given unit of input signal, a comparable unit of output signal becomes available from the amplifier circuit. From a practical standpoint, this means that all signals applied to the input of the circuit, such as through microphone transducer 5, will have an equal effect on the circuits and will be amplified and recorded on the recording media, that is, magnetic belt 9. The circuits are effective to record good quality signals throughout a wide range of frequency and voltage levels that may be encountered in the circuit. However, as is the case with most circuits, signals exceeding a particular voltage level cannot be accommodated by the circuit, are distorted because of circuit overloading, and result in an undesirable recording quality on recording media 9. The ratio of input to output signals may be considered 1 to 1 and the line in the graph of FIG. 3 with no control exerted reflects this by showing that a given input signal, such as −65 decibels, for example, will supply a roughly and approximately corresponding output signal of +10 decibels. A comparable 1 to 1 ratio exists along the entire line 14.

Graph line 17, FIG. 3, indicates the relationship of input and output signals when the electroluminescent-photoconductive circuits are effective. With photocell PC1 controlling the preamplifier stage including transistor T–1, and photocell PC2 controlling the intermediate amplifier stage including transistors T–2 and T–3, FIG. 5*a*, the arrangements are such that the ratio of input to output signals is changed from 1 to 1 ratio to approximately a 5 to 1 ratio. As an example, 25 decibels change in input signal results in 5 decibels change in output signal, FIG. 3. Therefore, the electroluminescent-photocell arrangements disclosed herein are effective to maintain a tighter control on the voltage levels encountered in the circuits, thereby minimizing the distortion and overloading and insuring that a better quality signal is recorded in the record media 9.

A consideration of the operation of the circuits in detail will reveal the principles of operation of the present invention and the high degree of effectiveness attained. Assuming that a Record mode is established by depression of buttons 18 and 20 on microphone handset 6, FIG. 2, both the Record relay and the clutch magnet are energized, FIG. 5*b*. As previously noted, the various contacts of the Record relay, R–1 through R–8 are effective to establish the proper connections for a record operation. Of particular interest in connection with the dynamic level control aspects of the circuits are the contacts R–7 and R–8 in FIG. 5*a*. Contacts R–7 are effective, when closed, to complete a series circuit connection for the electroluminescent panel EL3, FIG. 5*a*. Electroluminescent panel EL3 is connected by lines 32 and 33 to ground at 35. The other connection of EL3 is by line 36 to the secondary of a transformer 37 that is in the amplifier stage including transistor T–4.

The signals applied to microphone transducer 5 are directed through the R–4 contacts, transferred, to the base of transistor T–1. The amplified output from transistor T–1 is applied through an adjustable potentiometer 38 and the R–5 contacts, transferred, to the base of transistor T–2. The further amplified signal from the collector of transistor T–2 is applied through transistor T–3 to the base of transistor T–4 and to the primary of transformer 37. In a typical case, the input signal to transducer 5 may be in the range of microvolts or millivolts while the signal finally made available to the primary of transformer 37 may be about 3 to 4 volts RMS. Transformer 37 is a step up transformer and the voltage across the entire secondary winding from terminal 40 to terminal 41 may be in the range of 60 to 80 volts RMS. Only a small portion of this voltage is required for recording on belt 9 and is available between terminals 40 and 42 through the normally open clutch contacts, now closed, since the clutch is energized, through the contacts representative of R–1 and R–2 in parallel, through a high frequency equalizer circuit 43, through the R–6 contacts, now transferred, and by way of head 8 to recording belt 9. The greater portion of the signal derived from the secondary of transformer 37 is made available from terminal 41 to control the electroluminescent panel EL3. Panel EL3 supplies no light output below a certain predetermined voltage level. When peak signals are encountered in the circuit, however, a voltage greater than the useful predetermined level, such as in the range of 70 to 80 volts RMS becomes available across the secondary of transformer 37 to excite the panel EL3. The extent of excitation of panel EL3 varies in direct relationship with the amount of signal available from transformer 37.

The light output from panel EL3 is directed through photocells PC1 and PC2 in a negative feedback relationship to compress the peak signals, thereby minimizing distortion and overloading in the circuit. Photocell PC1 is arranged across the base to collector path of transistor T–1. Associated with photocell PC1 is a capacitor C1. Photocell PC2 is connected by contacts R–8, now transferred, across the base to collector path of transistor T–2. Associated with photocell PC2 is a capacitor C2.

When electroluminescent panel EL3 is in the dark state, that is, not excited by peak voltages from transformer 37, both of the photocells PC1 and PC2 are in a state of high resistance and have minimal effects on their associated amplifier stages. As electroluminescent panel EL3 becomes excited by potentials derived from transformer 37, photocells PC1 and PC2 react and effect control over their associated amplifier stages. The resistance of photocells PC1 and PC2 decrease as light output from EL3 increases. With a decrease in resistance of photocells PC1 and PC2, a portion of the amplified signals from transistors T–1 and T–3, respectively, passes through the associated photocell to the base of the respective transistor in a signal feedback relationship, and thereby reduces the amplified signal outputs of the transistors. Concurrently with development of light from panel EL3 to control photocells PC1 and PC2, light is also emitted from the portion EL3*a*, FIG. 5*a*, in a direction indicated by arrow 15 to give a visual indication of the voltage levels in the circuit. Portion EL3*a* may or may not be provided in the circuit as desired.

In the embodiment disclosed herein, the signals encountered are in the audio range primarily, that is, a range of 100 cycles per second to 5,000 cycles per second, for example. It may be desirable under some circumstances to provide more rapid or slower response of the electroluminescent-photoconductive elements depending upon the type of signal that is being recorded on record media 9. A possible arrangement for accommodating this is shown in FIG. 6. A switching means 45 is effective to connect an electroluminescent-photoconductive set 46 or an electroluminescent-photoconductive set 47 to an output terminal designated 48. Electroluminescent-photoconductive set 46 may be selected to exert tight control on the amplifier circuits through terminals 48 in order to minimize the effects of rapidly varying peak signals, as during the recording of speech. The electroluminescent-photoconductive set 47 is selected, on the other hand, to have a slower response to peak signals as may be desired during the recording of music, for example.

As a further example of the use of the circuit in FIG. 6, the electroluminescent-photoconductive sets 46 and 47 may be predicated upon frequency characteristics of the applied signals thereby exerting control on the basis of frequency. As an example, set 46 may exert dynamic level control throughout a wide range of frequencies such as 100 cycles per second to 5000 cycles per second. Set 47 on the other hand, may be selected to exert dynamic level control over a frequency range of 100 cycles per second to 2000 cycles per second. The frequency aspects of the control are primarily dependent upon the time constants established by the capacitors chosen in the respective circuits. Numerous other modifications of the electroluminescent-photoconductive circuit arrangements can be derived from the principles disclosed herein.

An important advantage of the electroluminescent-photoconductive dynamic level control arrangement disclosed herein is that the control of signal levels occurs in a rapid and efficient manner and that the elements involved also recover or release rapidly in order to be ready for subsequent control, as required. In a typical case, the response to the elements EL3, PC1 and PC2 is in the order of 25 to 50 microseconds attack time. Recovery time may be in the order of 100 to 500 milliseconds thereby insuring rapid response and control of the elements in the circuit. As noted in connection with FIG. 6, it may be desirable under certain circumstances to modify the release and recovery times depending upon the types of signals amplified.

During a reproducing or listening mode of operation, the Record relay is de-energized. With the Record relay de-energized all relay contacts are in their normal state. During the reproduce mode, signals are developed by movement of belt 9 past head 8, directed by contact R–6 to the base of transistor T–1, amplified by transistors T–1, T–2, T–3 and T–4 and applied through contacts R–1 and R–2 in parallel to speaker 16 or transducer 5. Contacts R–7 are open and contacts R–8 are in their normally closed state as shown in FIG. 5*a*. The effect of this is to disconnect the electroluminescent-photoconductive arrangement from the amplifier circuit during the reproducing of signals. Accordingly, no potential is available for electroluminescent panel EL3 and no light output is applied to photocells PC1 and PC2. Under these circumstances, photocells PC1 and PC2 have no effect upon their related circuits including transistors T–1 and T–2. Neither photocell need be disconnected from its associated circuit, ordinarily. However, some feedback control is desirable in connection with transistor T–2 during the reproduction of audio signals and the return of contacts R–8 to the condition shown in FIG. 5*a* disconnects photocell PC2 entirely and connects instead a capacitor 49 and a resistor 50 to provide some measure of feedback control. The connection of photocell PC1 to transistor T–1 is retained during the reproduce mode, but no control is exerted by photocell PC1.

While the invention has been particularly shown and described with reference to several embodiments, it will be understood by those skilled in the art that various changes in form and detail may be made without departing from the spirit and scope of the invention.

What is claimed is:

1. Apparatus for controlling signal levels, comprising:

an amplifier circuit having a plurality of amplifier stages;

an electroluminescent device and photoconductive device arranged as a signal controlling set, said photoconductive device being positioned in proximity to said electroluminescent device for control thereby;

means interconnecting said electroluminescent device to a particular one of said amplifier stages in order to derive a potential and to excite said electroluminescent device in accordance with peak signal levels encountered during signal amplifying operations;

means interconnecting said photoconductive device to a selected amplifier stage for controlling the signal level therein;

a record media;

means for recording signal representations in said media in accordance with signals amplified in said circuit;

signal transducer means for supplying audio signals representative of dictated material to the input of said amplifier circuit;

first switching means operable to connect said amplifier stages for recording signals on said media derived from said transducer and in the alternative to connect said amplifier stages to derive signals from said media and direct the same to said transducer for reproduction purposes;

and second switching means operable concurrently with said first switching means to connect said electroluminescent and photocell devices for controlling signal levels during recording operations, and for disconnecting said electroluminescent-photocell devices, thereby rendering them ineffective during reproducing operations.

2. Apparatus according to claim 1 further comprising:

switching means operable as said electroluminescent-photocell set is rendered ineffective to connect additional control elements into said amplifier circuit for controlling signal levels during a reproducing operation.

3. Apparatus according to claim 2, further comprising:

dictating apparatus including drive means for relatively moving said record media in order to record and reproduce signals;

and a microphone handset for housing said microphone transducer, said microphone handset having control elements for controlling the mode of operation of said equipment and the switching of said electroluminescent-photocell set as required.

4. Apparatus for controlling signal levels, comprising:

an amplifier circuit having a plurality of amplifier stages;

at least one electroluminescent device and first and second photoconductive devices arranged as a signal controlling set, said photoconductive devices being positioned in proximity to said electroluminescent device for control thereby;

means interconnecting said electroluminescent device to a particular one of said amplifier stages in order to derive a potential and to excite said electroluminescent device in accordance with signal levels encountered during signal amplifying operations;

means interconnecting each of said photoconductive devices to a respectively associated selected amplifier stage for controlling the signal level therein;

and mode control means for switching at least one of said photoconductive devices in to and out of controlling relation with respect to its associated amplifier stage.

5. Apparatus according to claim 4, wherein:

a portion of said electroluminescent device is arranged for viewing by an observer to give an indication of signal levels in said amplifier circuit.

6. Apparatus according to claim 4, further comprising:

an additional set of electroluminescent-photoconductive devices, each of said electroluminescent-photocell sets being selected for signal control activation in predetermined frequency ranges and at predetermined voltage levels that may be encountered during amplification of signals in said amplifier circuit;

and means for switching a desired one of said electroluminescent-photocell sets into operative connection with said amplifier circuit for controlling signal levels therein.

7. Apparatus as defined in claim 4, further comprising:

means for recording signal representations in a record media in accordance with signals amplified in said amplifier circuit;

and signal transducer means for supplying audio signals representative of dictated material to the input of said amplifier circuit.

References Cited

UNITED STATES PATENTS

| | | | |
|---|---|---|---|
| 3,020,488 | 2/1962 | De Miranda et al. | 330—59 |
| 3,087,120 | 4/1963 | Schoellhorn et al. | 330—59 |
| 3,132,213 | 5/1964 | Taylor et al. | 179—100.1 |
| 3,167,722 | 1/1965 | Weller | 330—59 |
| 3,182,271 | 5/1965 | Aiken | 330—59 X |
| 3,225,304 | 12/1965 | Richards | 330—33 X |
| 3,258,707 | 6/1966 | Lawrence | 330—59 |
| 3,268,815 | 8/1966 | Banach | 330—59 X |
| 3,379,991 | 4/1968 | Clerc et al. | 330—59 |

BERNARD KONICK, Primary Examiner

RAYMOND F. CARDILLO, Jr., Assistant Examiner

U.S. Cl. X.R.

250—209; 330—59